April 12, 1960     H. E. REINECKE     2,932,319
FLUID DISTRIBUTION VALVE MEANS
Filed Dec. 17, 1956     5 Sheets-Sheet 5
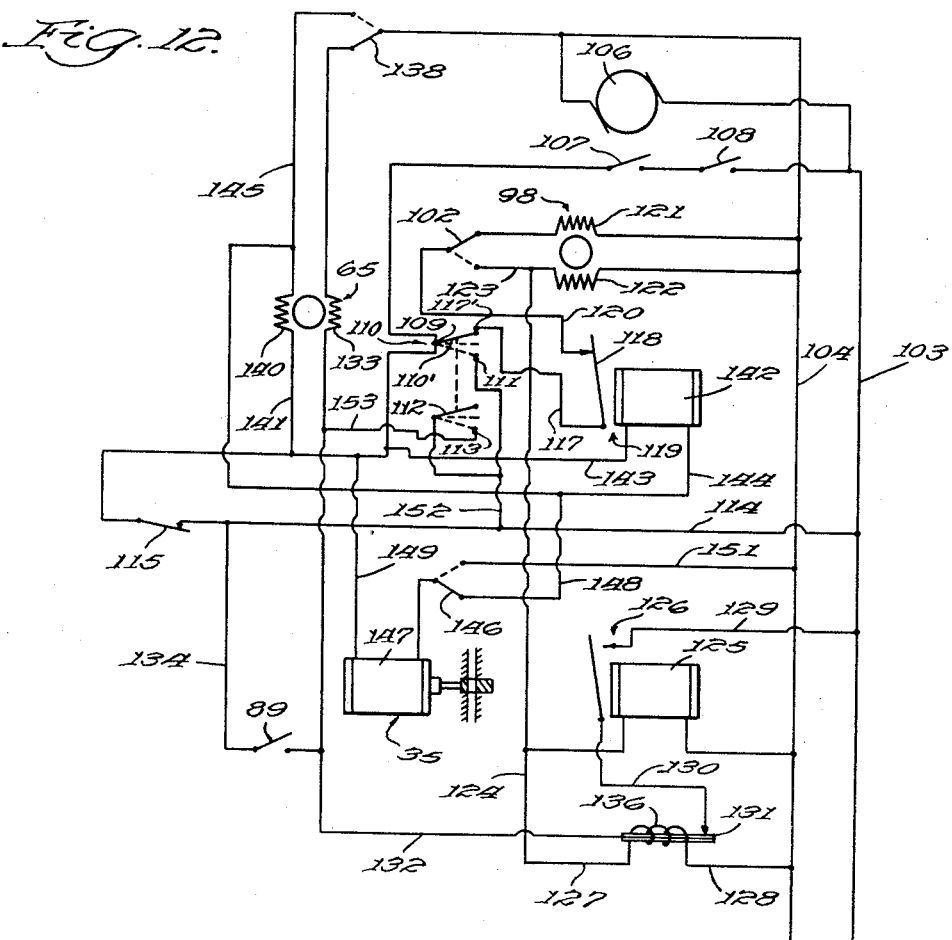
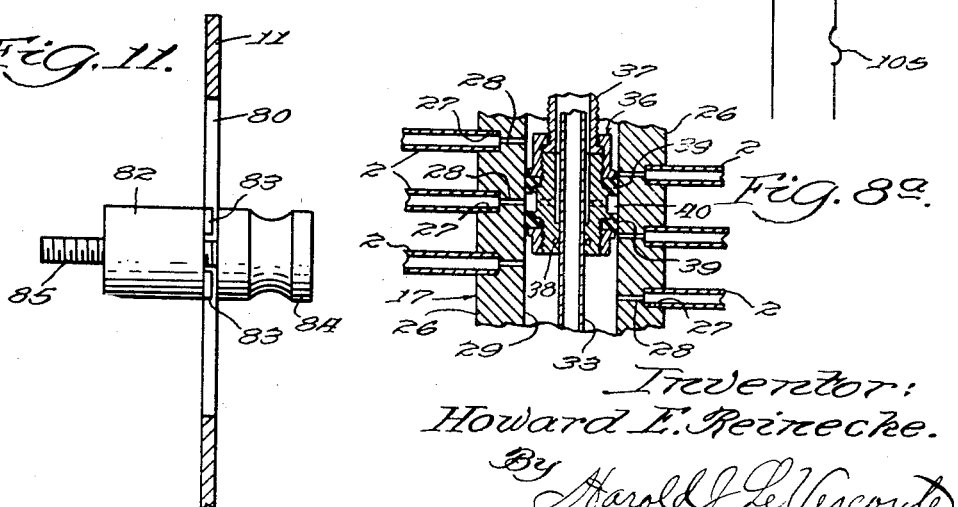
Inventor:
Howard E. Reinecke.
By Harold J LeVesconte
Atty.

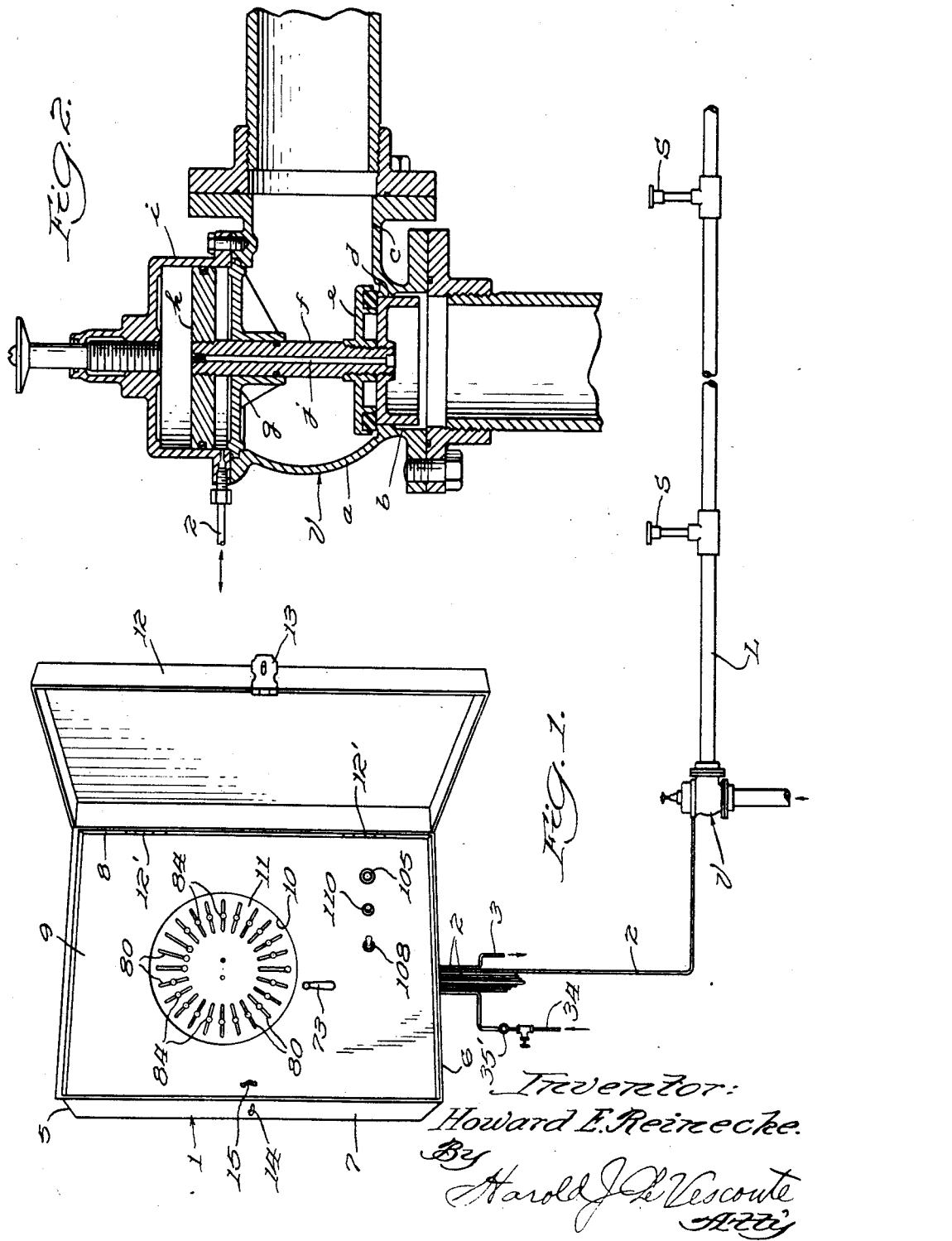

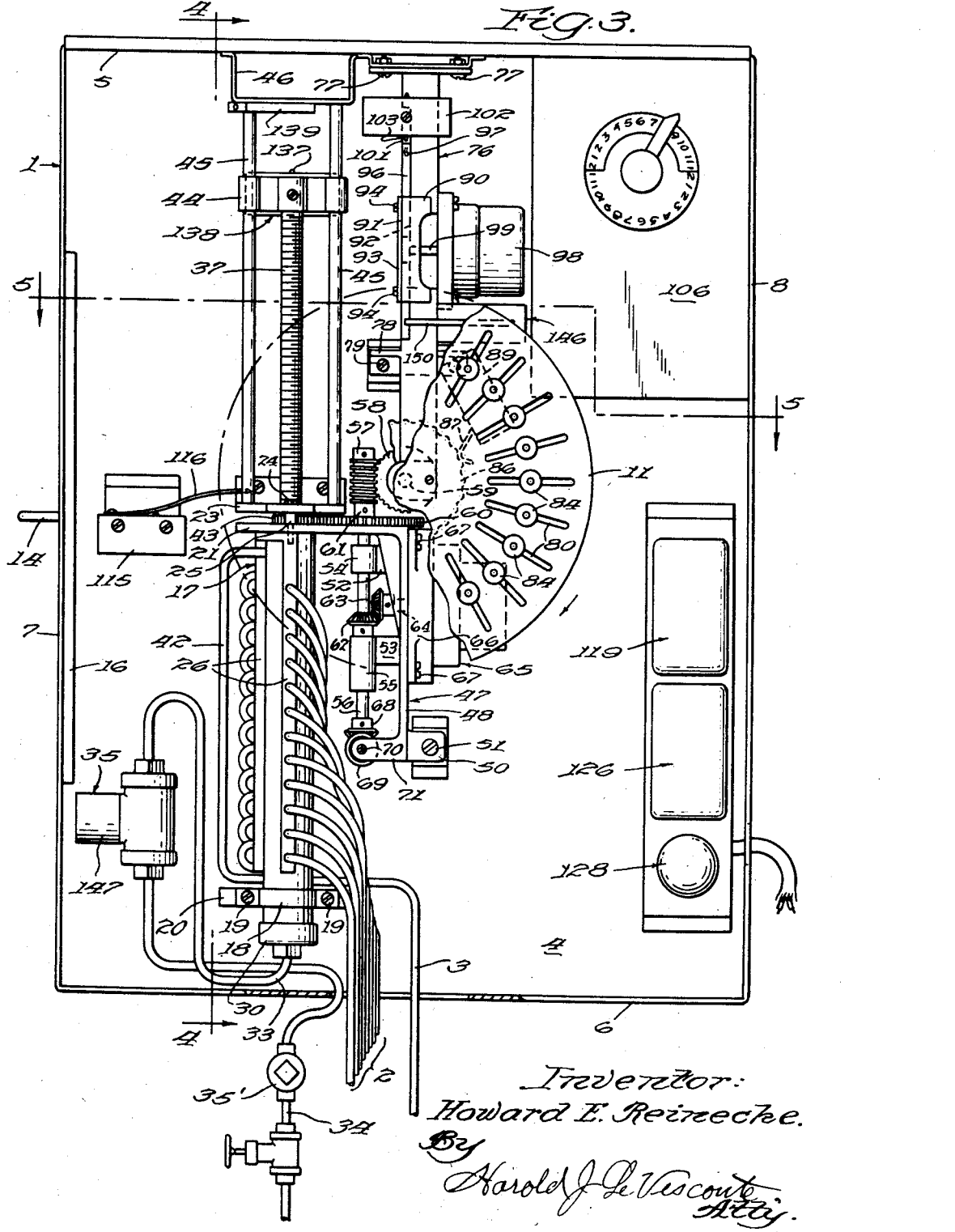

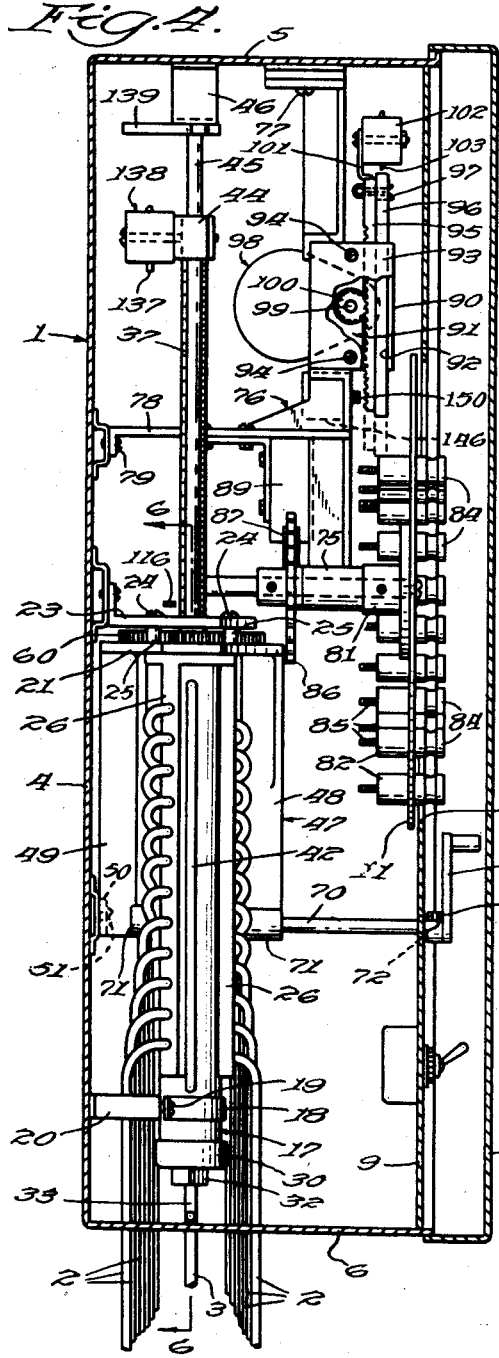
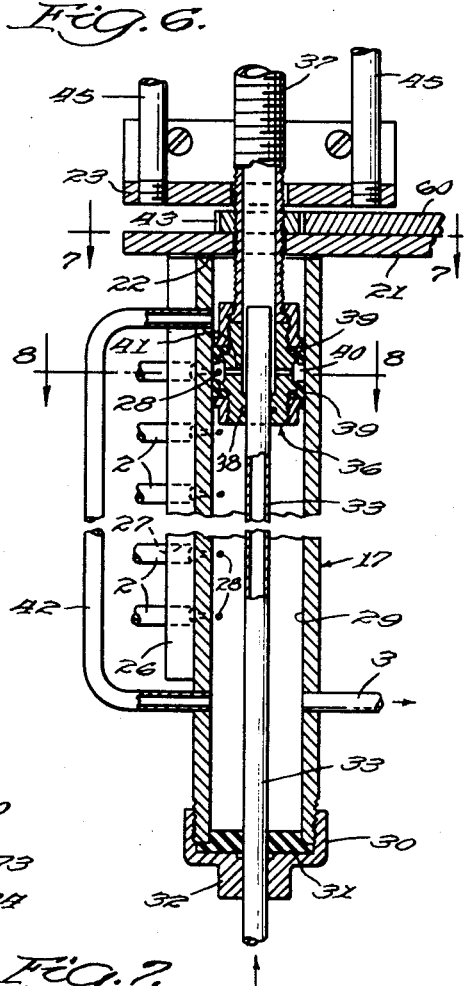

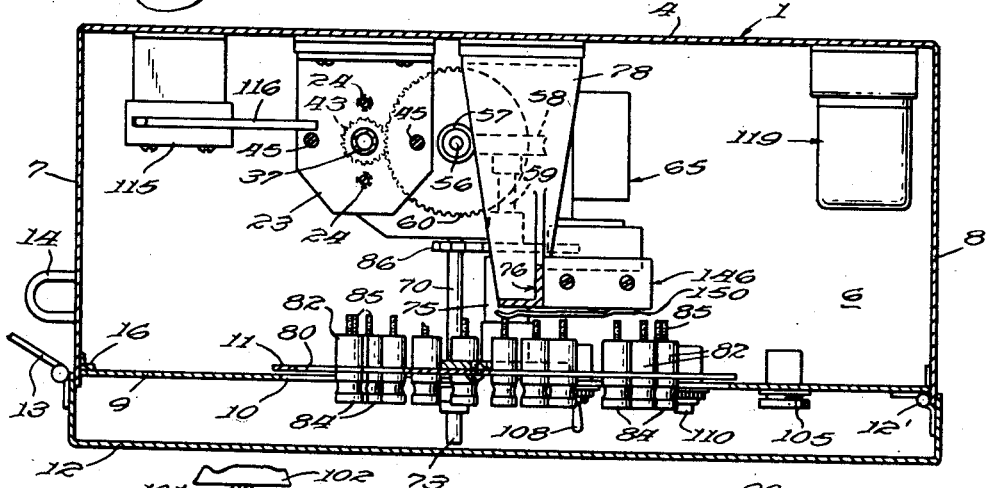
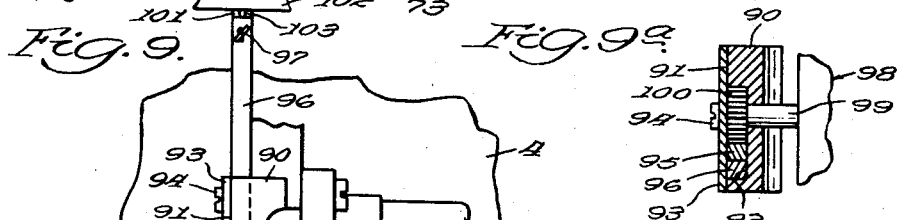
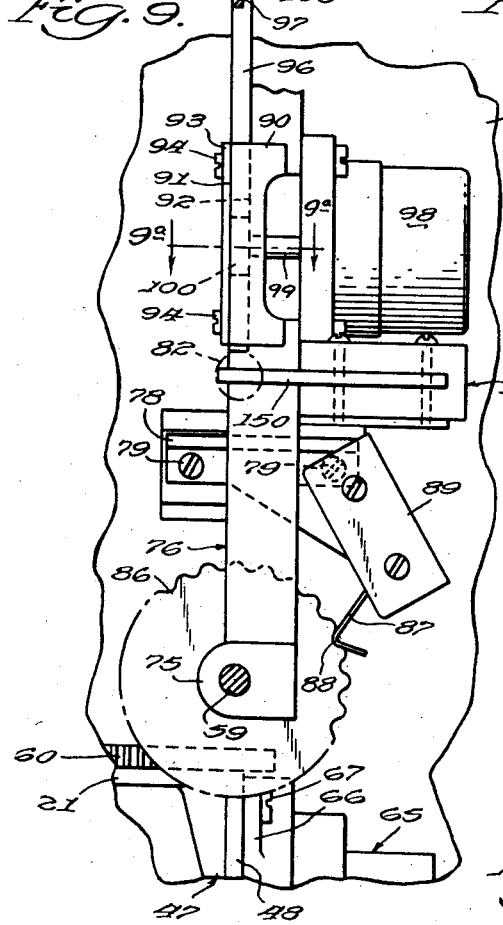
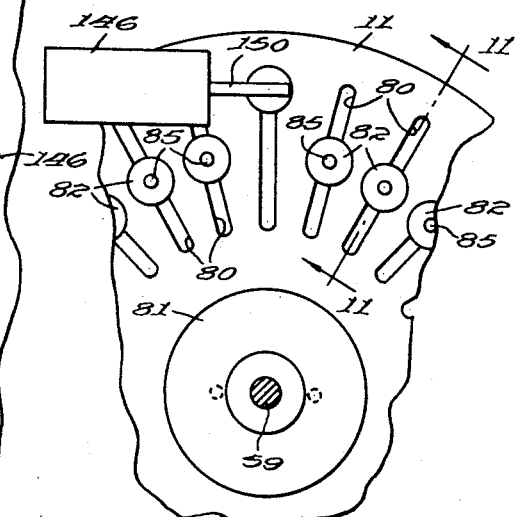

United States Patent Office 2,932,319
Patented Apr. 12, 1960

2,932,319

FLUID DISTRIBUTION VALVE MEANS

Howard E. Reinecke, La Crescenta, Calif.

Application December 17, 1956, Serial No. 628,719

11 Claims. (Cl. 137—624.2)

This invention relates to means for controlling fluid systems and more particularly to a device particularly adapted to automatically control the operation of irrigating systems and especially sprinkling systems.

The principal object of the invention is to provide a valve device for actuating the control valves of a sprinkling system in a predetermined sequence and for independently selected predetermined intervals for each valve or valves so operated and at predetermined times during the day or night.

Another object of the invention is to provide a control valve device in which the foregoing objective is realized in practice and in which the time interval at each station or valve operated thereby is readily adjustable.

A further object of the invention is to provide an automatic control valve device for irrigating systems which includes means for effecting manual control of the device for operating the device at any selected point in its normal cycle of operation.

Still another object of the invention is to provide a valve device for the automatic control of irrigating systems which, upon completion of its cycle of operation, returns to its starting position at the beginning of the cycle and shuts off until the time for its next cycle of operation.

A still further object of the invention is to provide a control valve device for irrigating systems in which all of the foregoing objectives are realized in practice, which is compact and readily connected to the system to be controlled thereby, is readily adjusted for the required cycle of operation of the system, and which is reliable for its intended purpose.

With the foregoing objectives in view, together with such additional objects and advantages as may subsequently appear, the invention resides in the parts, and in the construction, combination and arrangement of parts described, by way of example in the following specification of a presently preferred embodiment of the invention; reference being had to the accompanying drawings which form a part of said specification, and in which drawings:

Fig. 1 is a perspective front elevational view of the illustrated embodiment of the device as enclosed in its case, the cover of the case being in open position and the connection of the device to a control valve of a sprinkling system being also shown.

Fig. 2 is a medial sectional view of a control valve of a type adapted for use with the control device constituting the present invention, Fig. 3 is an enlarged scale front elevation of the device; the front panel of the casing being omitted and other parts partially broken away to show details otherwise concealed, Fig. 4 is a sectional view taken on the line 4—4 of Fig. 3, Fig. 5 is a top plan sectional view taken on the staggered line 5—5 of Fig. 3, Fig. 6 is an enlarged scale, fragmentary sectional view of the valve controlling means, the section being taken on the line 6—6 of Fig. 4, Figs. 7 and 8 are transverse sectional views taken on the lines 7—7 and 8—8 of Fig. 6, respectively, Fig. 8a is a fragmentary sectional view taken on the line 8a—8a of Fig. 8, Fig. 9 is a further enlarged, fragmentary view of the device as viewed from the rear side thereof, Fig. 9a is a fragmentary sectional view taken on the line 9a—9a of Fig. 9, Fig. 10 is a fragmentary rear elevational view of the stop carrying dial and specifically showing the actuation of one of the electrical switches on the device, Fig. 11 is a further enlarged fragmentary sectional view taken on the line 11—11 of Fig. 10 and showing the construction of a typical stop element and Fig. 12 is a circuit diagram of the electrical system of the device.

Before proceeding with the detailed description of the device, it should be mentioned that the wiring forming the electrical system and interconnection the various switches motors, and relays has been omitted from the drawings for clarity of illustration of the mechanical components; the circuit diagram being deemed sufficient for that purpose.

Referring first to Figs. 1 and 2, the device is enclosed in a housing or case 1 and exercises the control of the various valves of the system by hydraulic pressure transmitted through tubes 2 extending from the lower face of the case 1; one of said tubes being shown connected to a valve V interposed in a line L between a source of water supply and one or more sprinkler heads S. The device receives water from the said source through an intake line 34 and through its cycle of operation connects said intake one by one with the control tubes 2. The valve shown in Fig. 2 is typical of the type of valve for which the present invention is intended and includes a body $a$ having an inlet B and outlet $c$ and a valve seat $d$ engageable by a reciprocable valve element $e$ carried by a piston rod $f$ slidable in a wall $g$ opposite the valve seat and carrying a piston $h$ of greater diameter than the valve seat slidable in a cylinder member $i$ on the side of the wall $g$ opposite the valve seat, the valve closing against inlet flow. The control tube 2 communicates with the cylinder $i$ between the piston $h$ and wall $g$ and the piston rod $f$ has a bore $j$ extending therethrough and affording communication between the interior of the valve body $a$ and the side of the piston $h$ remote from the wall $g$. In the absence of line pressure in the tube 2 the line pressure in the system operating through the bore $j$ will hold the valve closed. When line pressure is applied through the tube 2, the combined areas of the piston and valve member respond to pressure in opposition to the pressure tending to close the valve and the valve opens. To put it another way, line pressure in the tube 2 equalizes the pressure on opposite sides of the piston and allows the pressure on the valve element $e$ to open the valve; the bore $j$ serving as an escape port for the water employed to close the valve. Closing of the valve and consequent expulsion of the water employed to open the valve is through the tube 2 and a waste line 3 as will be explained later. The valves controlled by this device do not form any part of the present invention and have been thus described in order that the operation of the device may be more readily understood as the detailed description of the device proceeds.

The case 1 comprises a rectangular structure having a back wall 4, top and bottom walls 5 and 6, side walls 7 and 8, a hingedly mounted front wall 9 having an opening 10 therein exposing the face of the timing dial 11, and a cover 12 hingedly mounted to enclose the front wall. As here shown, the front wall 9 and cover 12 are both mounted on hinges 12', 12' for independent movement, but they may be mounted on separate hinges if desired or the cover 12 may be completely removable if desired. Any suitable means for securing the cover in closed position may be employed such as the hasp and staple 13 and 14 for reception of a padlock or the like. A latch member 15 is mounted on the front wall at the side thereof opposite the hinged mounting; said latch engaging back of a stop strip 16 on the side wall 7 of the case. The bottom wall 6 is provided with an opening for the various tubes and the electrical conductors connecting the electrical apparatus within the case with a source of energy enter through an opening in the side wall 8.

The means for selectively directing the pressure for actuating the system valves to the various tubes 2 comprises a tubular valve body 17 disposed vertically in the case slightly to one side of the vertical center line of the case and extending from a point near the bottom wall 6 upwardly to a point near the mid-heighth of the case. A bracket means including a strap 18 and screws 19, 19 engaging a member 20 projecting outwardly from the back wall 4 secures the lower end of the body member in spaced relation to the back wall 4 and bottom wall 6. The upper end of the valve body 17 is closed by a plate 21 and an interposed gasket 22 secured thereto by the supporting means comprising the laterally extending bracket 23 projecting outwardly from the back wall 4 above the plate 21 a distance sufficient to provide clearance for gearing to be presently described and screws 24, 24 which extend downwardly through the bracket 23, thence through spacing collars 25, 25 thence through the plate and finally threadedly engage the upper end of the valve body 17 thus simultaneously closing the upper end of the valve body and securing said upper end in spaced vertical position in alignment with the securing means for the lower end of the valve body. The valve body 17 on the exterior thereof carries longitudinally extending radial fin members 26, 26 here shown as being spaced at somewhat less than 180° degrees apart and these fins are bored transversely of the axis of the valve body as at 27 to receive the ends of the various tubes 2; the tube receiving bores stopping short of the interior of the valve body and ports 28 of lesser diameter providing the communication between the tubes and the cylindrical interior 29 of the valve body. The ports 28 in each vertical row are vertically staggered with respect to the ports in the other row. The lower end of the valve body is closed by a cap 30 threadedly engaging the exterior of the valve body with an interposed gasket member 31. The cap has a depending, axially disposed boss 32 having an axial bore through which a tube 33 extends from an intake connection 34 with a solenoid operated shutoff valve 35 and a filter 35' and thence upwardly axially inside the valve body in the axial line thereof to a point slightly below the upper end of the valve body 17.

Slidably mounted in the valve body 17 and movable substantially from end to end therein is a piston like valve element 36, said piston being carried by a hollow piston rod 37 and having a close sliding fit with the tube 33 supplemented by a gasket element 38. Exteriorly, the piston carries two packing rings 39, 39 spaced from each other to provide an annular channel 40 disposed slightly above the level of the engagement of the piston 36 with the tube 33 and a series of ports 41 extend through the wall of the piston 36 into the channel 40. The width of the packing rings in such (see Fig. 8a) that when the channel 40 is centered over one of the ports 28 in one of the rows of such ports, the ports above the plane of that port in both rows of ports 28 are sealed off from communication with the port in registry with the channel. Thus, when the piston is moved opposite any one of the ports 28, water entering the tube 33 will be diverted through the ports 41 into the channel 40 and thence into the one of the ports 28 in registry with the channel 40 and through the tube 2 connected thereto will effect the opening of the control valve in the system to which such tube is connected. The piston is moved upwardly in an operating excursion in increments to engage the various ports in succession by means presently to be described. As it moves from one port 28 to the next shutting off inlet pressure from the control valve last actuated, the closing of the control valve will expel the water below the valve piston $h$ through the tube 2 and the discharge will be into the valve body 17 below the piston 36. The valve body 17 is provided with a tube 42 which provides a bypass around the piston 36 and returned water flows through this tube to the upper part of the valve body to maintain all tubes filled but not subject to inlet pressure with surplus water being expelled through the waste tube 3. Additionally, the tube 42 provides an equalizer for fluid displaced by the upward and downward movements of the piston 36.

The piston rod 37 is exteriorly threaded and the threads thereof are engaged by the threaded bore of a gear 43 disposed between the bracket 23 and the plate 21 and restrained against endwise movement by said bracket and plate, whereby, rotation of said gear in either direction will effect the upward or downward movement of the piston rod 37. At its upper end the piston rod is closed and carries a crosshead 44 slidably engaging guide rods 45, 45 disposed at each side of the piston rod and extending from the bracket 23 upwardly to a bracket 46 carried by the top wall 5 of the case.

The plate 21 is a lateral extension of a bracket 47 having a depending portion 48 disposed laterally of the valve body 17 and parallel thereto; said depending portion terminating in a rearwardly extending arm 49 having a laterally extending ear 50 which is attached to the back wall of the case by a screw 51. The face of the depending portion 48 adjacent the valve body 17 carries laterally extending arms 52 and 53 which terminate in aligned bearings 54 and 55 for a vertical shaft 56 which extends up through the bracket 47 and at its upper end carries a worm 57 meshing with a worm gear 58 fixed to a horizontal shaft 59 on which the dial 11 is mounted. Adjacent the top surface of the bracket 47 which is co-planar with the top surface of the plate portion 21, the shaft 56 carries a large gear 60 having a hub 61 pinned to the shaft which meshes with the gear 43 which threadedly engages the piston rod 37. Adjacent the upper face of the bearing 55, the shaft 56 carries a bevel pinion 62 which meshes with a bevel pinion 63 carried by the drive shaft 64 of a combined electric motor and speed reduction unit 65 having a mounting flange portion 66 attached to the bracket 47 by screws 67. The shaft extends below the bearing 55 and at its lower end carries a bevel pinion 68 which meshes with a bevel pinion 69 carried by a horizontal shaft 70 journaled in spaced bearings 71, 71 at the lower end of the bracket 47; said shaft extending forwardly through an opening 72 in the front wall 9 for detachable engagement with a hand crank 73; the form of engagement shown comprising a pin 74 extending across the shaft receiving hole in the crank and engaging a complementary diametral slot in the end of the shaft 70. The purpose of this hand operated shaft will be explained in the description of the operation of the device.

The horizontal shaft 59 is journaled in a bearing 75 carried by a bracket 76 secured to the top wall 5 of the case by screws 77, 77 and thence depending to a lower end carrying the bearing 75 intermediate its ends, the bracket 76 has a rearwardly extending arm portion 78 which is secured by screws 79, 79 to the rear wall 4 of the case. At its forward end the shaft 59 carries the timing dial 11 which is a sheet metal disc having a plurality of evenly spaced radial slots 80 extending from a point adjacent the hub 81 secured to the shaft 59 and to which the dial is secured, outwardly to a point adjacent the outer rim of the dial; said slots being equal in number to the number of valve operating tubes extending from the valve body 17. Each of said slots carries a stop member assembly such as shown in Fig. 11; each stop member assembly comprising a nut element 82 on the back face of the dial having lug portions 83, 83 entering the slot to prevent rotation of the nut element and a screw element 84 on the outer face of the dial and having a threaded shank 85 engaging the nut. Thus by loosening the screw element, the stop assembly can be moved to any desired radial position along the slot and locked therein by tightening the screw element of the assembly. Adjacent the rear face of the bearing 75, the shaft 59 carries a toothed cam wheel 86 having a "hill and dale" peripheral configuration equal in numbers to the number of the radial slots in the dial; said configuration being engaged by a leaf spring follower 87 having a bend 88 therein conforming to the dales of said cam wheel. This follower, when seated in the dales of the cam wheel, allows a normally open switch 89 actuated thereby to remain in open position so that as the dial and cam wheel are rotated by the motor 65 and the follower fully engages the next dale, the switch 89 will be opened, stopping the motor 65 until the dial is again indexed to the next position with a stop member interposed in the path of the timing means. The circuitry by which this is accomplished will be described in the specific description of the electrical system of the device and the operation thereof.

The bracket member 76 intermediate its length has a forwardly extending pad element 90 provided with a vertical flat face 91 disposed parallel to and above the shaft 59; said face having a vertical groove 92 formed therein and a cover plate 93 secured by screws 94, 94 overlying and enclosing said groove to form a guideway for a timing means comprising a rack 95 and a switch actuator rod 96 arranged in tight sliding engagement in said groove and loosely interconnected by a cotter pin 97. The bracket 76 carries a combined motor and speed reduction unit 98 having a shaft 99 carrying a gear 100 meshing with said rack. At its upper end, the rack 95 carries a bracket arm 101 on which an electric snap type switch 102 is mounted; said switch having a vertically disposed operating plunger 103 extending therethrough and having its lower end disposed directly above the switch actuator rod 96 and its upper end adapted for engagement with the top wall 5 of the case. The switch actuator rod is disposed in a vertical plane containing the axis of the shaft 59 and in a plane transverse to said axis closely adjacent to the rear face of the dial 11, whereby, when the rack and switch actuator rod are moved downwardly by the motor unit 98 the rod will engage the one of the stop member assemblies which has been positioned beneath the path of movement of the rack and rod, continued downward movement of the rack will bring the switch and its plunger into engagement with the switch actuator rod with relative upward movement of the plunger. The action of the switch reverses the direction of rotation of the motor and thus the rack and rod move upwardly until such upward movement brings the plunger 103 into contact with the top wall of the case with resultant relative downward movement of the plunger and reversal of the motor unit 98 to move the rack and rod downwardly again. Incident to the reversal from upward movement to downward movement of the rack and rod, the electrical system effects the movement of the dial and of the distribution control valve actuated by the motor unit 65 so that by the time the rod and rack have again reached their lowermost travel, the next stop member will be engaged to cause the reversal of upward movement of the rack and rod. In this connection, it is to be noted that this reversal takes place at whatever elevation the stop member encountered by the rod 96 may be set. The rate of travel of the rack and rod is such that the time required for a complete reciprocation from the lowest position at which a stop member assembly may be set in its slot in the dial is equivalent to the extent of the greatest time required for a sprinkling operation at any one point in the system and the outermost position of a stop member will determine the minimum extent of time required.

*Electrical system*

The electrical system is connected to main leads 103 and 104; the "hot" lead 103 being appropriately protected by a fuse 105. The apparatus is started in its cycle of operations by a clock 106 connected to the leads 103 and 104; said clock actuating a switch 107 to the lead 103. A manually operable master switch 108 is interposed in the lead 103 in advance of the switch 107 to prevent automatic operation of the apparatus by the clock when desired. The lead 103 terminates at the common contact 109 at the double throw side of a double throw, double pole switch 110. This switch is arranged to operate with snap action between neutral position and the contact 117' with the lead 117 and is spring biased to return to neutral from the opposite throw during which the moving contact member 110' engages the contact 111 to which reference will later be made. The other moving contact 112 of this switch is idle when contact 117' is engaged and when the switch is moved to the opposite throw, it engages a contact 113 to which reference will also be made later. This switch is a standard article of commerce and its mode of operation has been explained in the interest of understanding the circutry of the invention. A lead 114 extends from the lead 103 through an interposed normally closed switch 115 and also connects with the common contact 109 of the switch 110. The normal cycle of operation of the device begins with the piston 36 at the bottom of the valve body tube 17 with at least the upper ring 39 sealing off the port 28 to which the lowermost of the tubes 2 is connected. On the preceding cycle of operation, upon reaching the upper limit of its movement, direction of movement of the piston was automatically reversed and it was moved downwardly substantially to its lower limit of movement at which time the crosshead 44 has engaged a pivoted arm 116 which moves the switch 115 to open position. The lead 103 supplies current to the contact 109 upon closure of the normally open switch 107 by the clock and this initiates the cycle of operations of the device including the beginning of upward movement of the piston 36 and resultant closure of the spring biased, normally closed switch 115 with resultant supply of current to the contact 109 through the lead 114. The switch 107 is opened by movement of the clock within a short period after closure, but the switch 115 has been closed in the meantime. During automatic operation of the device the moving contact member 110' of the switch 110 is connected by a lead 117 to one side the armature 118 of a normally closed relay 119; said armature when in closed position making contact with a lead 120 which in turn is connected to the common side of the single pole, double throw snap action switch 102 having its other binding posts connected respectively to the coils 121 and 122 which rotate the motor 98 in directions which impart up and down movements, respectively, to the rack 95. Thus, so long as the master switch and either the switch 107 or the switch 115 are closed, the motor 98 will continue to operate.

The lead 123 extending from the switch 102 to the motor coil 122 is connected by a lead 124 which, in turn, is connected with the lead 104 by a lead extending through the coil 125 of a normally open relay 126. The relay 126, when closed, interconnects a lead 129 extending from the lead 103 with a lead 130 having normally closed contact engagement with one end of a bi-metal strip 131 forming a component of the time delay relay 128, the other end of said strip being connected by a lead 132 with the coil 133 which causes the motor 65 to rotate in a direction to move the piston 36 upwardly and at the same time rotate the dial 11 and cam wheel 86. The beginning of this rotation will cause the cam wheel 86 to close the switch 89, whereupon, current for the continued operation of the motor 65 will be supplied through the lead 134 which connects the lead 132 with the lead 114 and in which the switch 89 is interposed, until the follower 87 drops into the succeeding dale and opens the switch 89. At the same time, leads 127 and 128 connect a resistance 136 disposed adjacent to the bimetal strip 131 with the leads 124 and 104 and heat it with resultant bending of the strip and breaking of the contact with the lead 130. The purpose of this time delay opening is to provide a means whereby the motor 65 may be started in a direction to move the piston 36 upwardly even though the normal operating circuit is interrupted by the open switch 89 which operates to open the circuit and stop the motor before the bimetal strip has returned to contact making position. It is to be noted that by this means, the indexing of the dial and its stops occurs while the rack is at or near the upper end of its stroke and has just commenced its downward movement.

This cycle of successive reciprocations of the rack and indexing movements of the dial with the coincident increments of upward movement of the piston and resultant successive operation of the system valves controlled thereby continues until the piston has engaged the most upwardly of the ports 28 and the rack has completed its reciprocation determining the time in connection with that port. The completion of the upward movement of the rack will again cause the motor 65 to move the piston upwardly, but in so doing, a push rod 137 carried by and operating a reversing switch 138 mounted on the cross head 44 engages an arm 139 adjustably positioned on one of the guide rods 45 and disconnects the coil 133 from the lead 103 and connects the coil 140 to that lead, the current being then supplied by the lead 114 through the lead 141 with resultant reversal of the motor 65 and dial 10 and downward movement of the piston 36. During this time, the coil 142 of the relay 119 is energized through the lead 143 from the lead 114 to the coil and the lead 144 extending from the coil to the lead 145 between the switch 138 and the coil 140 of the motor 65. This opens the relay 119 and prevents to motor 98 from operating while the apparatus is moving to reset position. When the cross head reaches its lowest position with the piston 36 positioned below the lowest port 28, the push rod 137 engages the top surface of the bracket 23 reversing the motor 65 and substantially simultaneously the cross head engages the operating arm 116 opening the switch 115 and stopping the apparatus until again started by closing the clock operated switch 107 or by manual movement of the switch 110 to its dotted line position.

The solenoid valve 35, is normally open and is closed under two different conditions. In connection with the above described action of the apparatus in moving to reset position, a single pole double throw switch 146 spring biased in one direction, maintains the coil 147 of the solenoid valve connected in parallel with the energizing circuit for the coil 142 through leads 148 and 149 and thus upon energization of coil 142, coil 147 is simultaneously energized causing the valve to shut off supply to the valve body 17 during the re-set operation. The switch 146 is positioned in rear of and closely adjacent to the rear of the dial 11 at the level of the outermost radius of the stop member studs 85. When in any given installation, it is desired to omit one of the positions designated by a stop member, that member is moved to its outermost position. As it comes to the upper vertical position, the end of the stud 85 will engage a feeler arm 150 carried by the switch and move the switch to the dotted line position in Fig. 12. In this position, the coil is connected by the lead 151 to the lead 104 and by the lead 149 to the lead 114 and thus to the lead 103. In the outermost position of the stop members the rack has a very limited travel, taking less than a minute to complete its reciprocation and effect the next indexing movement of the dial, but during that time the valve body 17 is cut off from the supply and the system valve to be operated at that point will be omitted.

There remains to be described the purpose of the manual switch 110. In the normal automatic operation of the apparatus, it occupies the full line position above described. When, during a time when the apparatus is idle, as between cycles of operation, it is desired to move the dial to a specific position to operate a specific system valve, the switch 110 is first moved to its intermediate position. Then momentary movement of the switch to the dotted line position will cause the member 110' to connect the common contact 109 directly with the "hot" lead 103 through the leads 114 and 152. At the same time, the switch member 112 connects the lead 152 with the lead 132 through lead 153, causing the motor 65 to start to move the piston 36 upwardly and through the initial corresponding movement of the cam wheel 86 closing the switch 89 and thus effecting the continuing rotation of the cam wheel and dial until the switch 89 is again momentarily operated to effect the next indexing of the dial and so on until the desired position is reached. Optionally, the switch 110 can be held in the position with continued rotation of the dial until the desired position is reached. Since the piston and the cross head are moving upwardly during these operations, even though started at the shutoff position, the switch 115 will have been closed and upon cessation of the manual indexing of the dial, the apparatus will continue to complete the cycle from the point at which manual indexing ceased, and the manual indexing can be repeated after the desired operation at one or more of the selected points to bring the cross head to engage the operating bar to initiate the re-set action.

As here shown, the apparatus is arranged for twenty-four operating tubes each of which may operate one or more system valves. It will be appreciated that this number is not fixed and that greater or lesser numbers of operating tubes may be employed. For example, the present apparatus with the same parts may be employed for lesser numbers of stations or operating tubes by omitting to provide the additional ports 28 in the valve body 17 and by using a dial having spaced stop member slots equal in number to the number of tubes to be supplied together with a corresponding cam wheel; it being necessary only to use an appropriate combination of worm and worm wheel between the shafts 56 and 59 and suitable adjustment of the bar 139 along the guide rod on which it is mounted.

Alternatively; the dial and the associated mechanism ordinarily actuated by the motor 65 may be moved to any desired position by operating the shaft 69 by the crank 73. This might be required either incident to power failure or to repair or adjustment; it being noted that so long as the piston is correctly positioned with respect to any of the ports 28, the system valve or valves affected will be opened or closed as the piston position is changed.

Thus, there has been provided an effective control means for irrigating systems which is compact in form and is readily adapted to a wide range of uses such as varying times and lengths of times at selected points and which further, while being completely automatic, is provided with manual operating means whereby selective action can be achieved without interference with the established automatic operating cycle. Still further the elapsed time at any station may be varied readily without the necessity of disabling the apparatus for that purpose.

While the foregoing specification discloses a presently preferred embodiment of the invention, it will be understood that the invention is not to be deemed to be limited to the embodiment disclosed by way of example, and it will be understood that the invention embraces all such modifications and changes in the parts and in the construction, combination and arrangement of parts as shall come within the purview of the appended claims.

I claim:

1. In a distribution valve and actuating means therefor, a valve body having an elongated valve chamber, a valve member reciprocable in said valve chamber, a fluid inlet means in said body, a plurality of outlet ports communicating with said valve chamber and arranged in spaced relation along the line of reciprocation of said valve member, means maintaining said fluid inlet means in constant fluid conducting relation with said valve member, other means interconnecting said fluid inlet means with said outlet ports in sequential succession as said valve member is moved along its path of travel, and devices for causing said valve member to be moved along its path of travel in step-by-step increments of such amplitude that at each step at least a different one of, but less than all of said outlet ports is placed in communication with said fluid inlet means.

2. A valve and actuating means therefor as claimed in claim 1 in which said devices for moving said valve member include means for determining the time interval of each step of movement thereof.

3. A valve and actuating means therefor as claimed in claim 1 in which said devices for causing movement of said valve member include manually operable means for optionally determining the time interval of each step of valve member movement independently of the time interval of any of the other steps.

4. In a distribution valve and actuating means therefor, a valve body having an elongated valve chamber, a valve member reciprocable in said valve chamber, a fluid inlet means in said body, a plurality of outlet ports communicating with said valve chamber and arranged in spaced relation along the line of reciprocation of said valve member, means maintaining said fluid inlet means in constant fluid conducting relation with said valve member, other means interconnecting said fluid inlet means with said outlet ports in sequential succession as said valve member is moved along its path of travel, and devices for causing said valve member to be moved in one direction along its path of travel in step-by-step increments of such amplitude that at each step at least a different one of, but less than all of, said outlet ports is placed in communication with said fluid inlet means and for returning said valve member to its starting position without interruption upon completion of its said step-by-step movement in one direction.

5. A valve and actuating means therefor as claimed in claim 4 in which said devices for moving said valve member include means for determining the time interval of each step of movement thereof.

6. A valve and actuating means therefor as claimed in claim 4 in which said devices for causing movement of said valve member include manually operable means for optionally determining the time interval of each step of valve member movement independently of the time interval of any of the other steps.

7. A valve and actuating means therefor as claimed in claim 6 in which said manually operable means for each of said steps having a range of movement sufficient to cause said devices to skip any selected one of said steps and consequent selective omission of connection of an outlet port with said inlet means.

8. In a valve and actuating means therefor, a valve body having an elongated cylindrical valve chamber therein, a piston-like valve member reciprocable in said valve chamber, a fluid inlet means in said body, a plurality of outlet ports communicating with said valve chamber and arranged in spaced relation along the line of reciprocation of said valve member, a pair of gasket means disposed in axially spaced relation on said valve member engaging the wall of said valve chamber, means maintaining said fluid inlet means in constant fluid conducting relation with said valve member, other means disposed between said pair of gasket means interconnecting said fluid inlet means with said outlet ports in sequential succession as said valve member is moved along its path of travel, and devices for causing said valve member to be moved along its path of travel in step-by-step increments of such amplitude that the space between said pair of gasket means is opposite at least one of said outlet ports at each such step with resultant establishment of fluid flow from said fluid inlet means to an outlet port then opposite said space.

9. A valve and actuating means therefor as claimed in claim 8 in which said devices for moving said valve member include means for determining the time interval of each step of movement thereof.

10. A valve and actuating means therefor as claimed in claim 8 in which said devices for causing movement of said valve member include manually operable means for optionally determining the time interval of each step of valve member movement independently of the time interval of any of the other steps.

11. A valve and actuating means therefor as claimed in claim 8 in which said devices for moving said valve member include a rod attached to said valve member and extending to the exterior of said valve body, an electric motor and mechanism actuated thereby engaging said rod and effective to impart reciprocatory motion to said rod and said valve member.

References Cited in the file of this patent

UNITED STATES PATENTS

| | | |
|---|---|---|
| 1,598,238 | Brooks | Aug. 31, 1926 |
| 1,606,245 | Lang | Nov. 9, 1926 |
| 2,311,108 | Hauser | Feb. 16, 1943 |
| 2,395,150 | Sloan et al. | Feb. 19, 1946 |
| 2,580,122 | Parker | Dec. 25, 1951 |
| 2,625,428 | Coles | Jan. 13, 1953 |
| 2,680,378 | Moe | June 8, 1954 |